L. A. SUNDERLAND.

MILK-CAN.

No. 7,450. Reissued Dec. 26, 1876.

WITNESSES

Ed. L. Nottingham

Thos. B. Hall

INVENTOR

L. A. Sunderland.

By Leggett and Leggett.

ATTORNEYS

THE GRAPHIC CO. N.Y.

UNITED STATES PATENT OFFICE.

LUCIUS A. SUNDERLAND, OF MADISON, OHIO.

IMPROVEMENT IN MILK-CANS.

Specification forming part of Letters Patent No. 101,784, dated April 12, 1870; reissue No. 7,450, dated December 26, 1876; application filed October 7, 1876.

*To all whom it may concern:*

Be it known that I, LUCIUS A. SUNDERLAND, of Madison, Lake county, State of Ohio, have invented certain new and useful Improvements in Milk-Cans, and cans for other purposes; and I do hereby declare that the following is a full, clear, and exact description of the same, reference being had to the accompanying drawings, forming a part of this specification.

My invention relates to cans.

Figure 1:
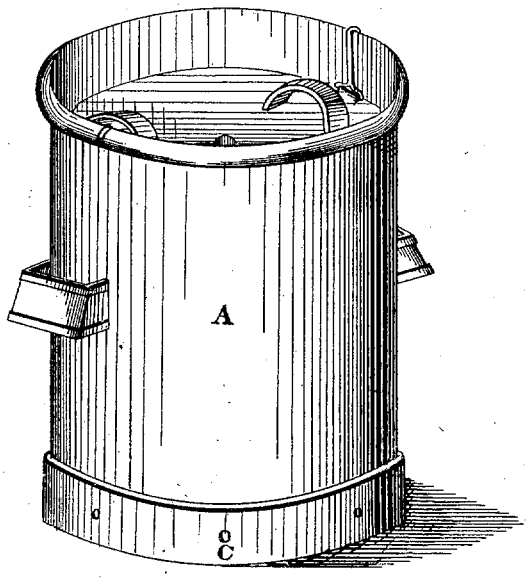
Figure 2:
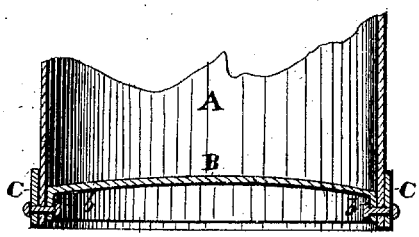

In the drawing, Figure 1 represents a perspective view. Fig. 2 is a section of a can embodying my invention.

A is the body of the can, which may be made of any suitable material, and of any size or capacity. B is the bottom, preferably so formed as to present a convex surface to the interior of the can. It is provided with the flange *b*, extending downward, and of sufficient width to protect the exterior face of the bottom against wear and injury.

The bottom is made of tin-plate, or of any sheet metal of sufficient thickness to give the requisite strength, according to the size of the can required. This construction of bottom greatly diminishes the wear of the same by avoiding the springing thereof, and by the protection afforded its exterior surface.

The bottom B is preferably constructed with a convex upper surface, as such construction makes an arch capable of much resistance.

The bottom B being placed in the body A, and the hoop or band C set on, as represented, they are fastened together, and a very strong and unyielding can is the result. The inside may then be soldered, as also may be the outside.

I prefer that the bottom shall be held by rivets passing through the hoop, sides, and flange of the bottom, thereby making a stronger can than can be made by use of solder alone.

By this mode of construction a much cheaper can is made, and one fully as desirable, and more easily made than under my patents formerly granted.

What I claim as my invention, and desire to secure by Letters Patent, is—

A milk-can consisting of the body A, provided with bottom B, having a downwardly-turned flange, *b*, which latter is secured above the lower edge of body A, and a hoop, C, secured to the outside of body A, and of sufficient width to extend from the lower edge of body A, above the flange *b* of bottom B, whereby the body, bottom, and hoop may be secured by the same rivets, substantially as and for the purpose set forth.

LUCIUS A. SUNDERLAND.

Witnesses:
J. B. HAYDEN,
D. HERBERT ROE.